(12) United States Patent
Williams, Jr.

(10) Patent No.: US 7,848,897 B2
(45) Date of Patent: Dec. 7, 2010

(54) DYNAMIC REAL-TIME POWER SYSTEM MONITORING

(75) Inventor: Olin A. Williams, Jr., Lawrenceville, GA (US)

(73) Assignee: Southern Company Services, Inc., Atlanta, GA (US)

( * ) Notice: Subject to any disclaimer, the term of this patent is extended or adjusted under 35 U.S.C. 154(b) by 535 days.

(21) Appl. No.: 12/022,765

(22) Filed: Jan. 30, 2008

(65) Prior Publication Data

US 2010/0087959 A1    Apr. 8, 2010

(51) Int. Cl.
  *G06F 19/00* (2006.01)
(52) U.S. Cl. .................................................. 702/60
(58) Field of Classification Search ............. 702/60, 702/64, 182–185, 188
  See application file for complete search history.

(56) References Cited

U.S. PATENT DOCUMENTS

| | | | |
|---|---|---|---|
| 4,187,415 A | 2/1980 | Boutmy et al. |
| 4,300,182 A | 11/1981 | Schweitzer, III |
| 5,396,806 A | 3/1995 | Dechene et al. |
| 5,483,153 A | 1/1996 | Leeb et al. |
| RE35,561 E | 7/1997 | Mashikian et al. |
| 5,710,542 A | 1/1998 | Jurisch |
| 6,771,058 B2 | 8/2004 | Lapinksi et al. |
| 6,873,746 B2 | 3/2005 | Stewart et al. |
| 6,917,888 B2 | 7/2005 | Logvinov et al. |
| 7,023,324 B2 | 4/2006 | Kodama et al. |
| 7,076,378 B1 | 7/2006 | Huebner |
| 7,078,982 B2 | 7/2006 | Bertrand |
| 2003/0214426 A1 | 11/2003 | Sechi et al. |
| 2003/0218549 A1 | 11/2003 | Logvinov et al. |
| 2004/0096214 A1 | 5/2004 | Morreale et al. |
| 2004/0096215 A1 | 5/2004 | Evangelides, Jr. et al. |
| 2005/0125104 A1 | 6/2005 | Wilson et al. |

(Continued)

FOREIGN PATENT DOCUMENTS

JP    2002058163    2/2002

(Continued)

OTHER PUBLICATIONS

Silva, et al., "Impulse Response Analysis of a Real Feeder for High Impedance Fault Detection" pp. 276-283, (1994) IEEE.

(Continued)

*Primary Examiner*—Edward Raymond
(74) *Attorney, Agent, or Firm*—Womble Carlyle Sandridge & Rice, PLLC

(57) ABSTRACT

A method and system for real-time monitoring of a power system having a plurality of locations forming a transmission and distribution grid, wherein each location includes a plurality of connected components. A plurality of pseudorandom signals are injected at selected locations in the power system. A plurality of power system data are collected at other locations in the power system in response to the injected signals. A dynamic behavior of the power system is determined through a synchronized cross-correlation of the injected signals with the collected power system data. The dynamic behavior of the power system is analyzed to assess a dynamic stability and security state of the power system. The real-time, dynamic stability and security state of the power system is displayed to an operator at a monitoring station. The operational stability and security state can be depicted on an overlay of the nationwide power system grid.

28 Claims, 10 Drawing Sheets

U.S. PATENT DOCUMENTS

| | | |
|---|---|---|
| 2006/0111860 A1 | 5/2006 | Trias |
| 2006/0235574 A1 | 10/2006 | Lapinski et al. |
| 2007/0002771 A1 | 1/2007 | Berkman et al. |
| 2007/0192078 A1 | 8/2007 | Nasle et al. |
| 2009/0066528 A1* | 3/2009 | Bickel et al. ............ 340/657 |
| 2009/0289809 A1* | 11/2009 | Gray et al. ............ 340/870.11 |

OTHER PUBLICATIONS

Horan, et al., "A Novel Pulse Echo Correlation Tool for Transmission Path Testing and Fault Finding using Pseudorandom Binary Sequences" (2005) IEEE.

Jensen, et al., "Feature Extraction Method for High Impedance Ground Fault Localization in Radial Power Distribution Networks" pp. 1177-1180 (1998) IEEE.

Nishiyama, et al., "Fault Detection for Power Transmission Line by Use of M-Sequence Correlation" pp. 465-469 (2002) IEEE.

Nishiyama, et al., "A Method for Fault Detecting on Twisted Pair Cable Network by Use of M-Sequence Correlation" pp. 1929-1934 (2004) IEEE.

Humpage, et al. "Hilbert Transform in Impulse Functions of Power Transmission Line Electromagnetic Transient Model" (1983) IEEE.

Horan, et al. "A Novel Pulse Echo Correlation Tool for Transmission Path Testing and Fault Diagnosis" (2007) Inst. of Engineering and Technology.

Zhang, et al. "Improvements in the Realization of a Real-Time Digital Simulator of a Power Transmission Line" pp. 356-361.

* cited by examiner

DYNAMIC REAL-TIME POWER SYSTEM MONITORING

BACKGROUND OF THE INVENTION

The present invention relates generally to electric power transmission systems and, more particularly, to monitoring of electric power transmission systems.

In August 2003, the electric power transmission system experienced the largest blackout in North American history. One seventh of the U.S. population and one third of the Canadian population were affected by this event. A total of 508 generating units shut down. One recommendation of a U.S.-Canada Power System Outage Task Force created after the blackout was to evaluate and adopt better real-time tools for operators and reliability coordinators.

Currently, electric utilities operating the power grid take measurements of power system parameters such as voltage, current and phase angle information at various points throughout their operating territories and apply them to mathematical models of the power system, its connectivity, and its various components. Information derived from these models is then used as a means of monitoring the grid and providing information for operators and coordinators. There are a number of Energy Management Systems (EMS) provided by different vendors that are currently in use by the utilities using a variety of data collecting communication protocols for gathering the monitored electric system data. These differences create challenges to sharing this information in real-time between neighboring utilities for conventional operating coordination and security. Actual power system measurements, from a subset of all key data points in the power system, are typically captured using a Supervisory Control and Data Acquisition (SCADA) system. Each substation connected to the power grid is equipped with several potential transformers and current transformers to measure voltage, current, and electric power flow on each line and bus. The real-time voltage and current data is transmitted from each substation to a central computer through a remote terminal unit. These acquired readings from throughout the power system are then processed by a state estimator algorithm to determine a complete set of the most likely values for all key points in a model of the power system. System security applications are run on these models to assess the ability of the power system to recover form various possible disturbances. This security contingency analysis attempts to determine if the power system will return to an equilibrium state or become unstable after selected system disturbances.

One characteristic of power system modeling for conventional security analysis is that the system topology and component parameters must be correct for the results to be meaningful. Inaccuracies in conventional security analysis can occur if data sampled from the actual power system are applied to a model that fails to consider a change in system topology, e.g., an open transmission line in its connectivity topology. Furthermore, inaccuracies in the models used for various power system components, such as transmission lines and power plants, can lead to an inaccurate security analysis.

SUMMARY OF THE INVENTION

Embodiments of the invention are directed to monitoring the dynamic characteristics of an electric power transmission system in real-time. It is based on a technique for determining the impulse response of a system by cross-correlating an appropriate input noise signal with the output of the system. This technique is applied to subsections of the transmission system being monitored and the results are combined to provide an overall real-time indication of the dynamic state of the power system. This new monitoring method and system are completely separate from and independent of the currently used transmission system monitoring approaches like EMS, SCADA and synchronized phasor measurements. The dynamic behavior of the power system is analyzed using new forms of power system security and stability state assessments based on actual calculated real-time system impulse response information. This information about the dynamic state of the power system is not currently used in conventional security and stability analysis. It therefore enables new forms of security and stability state measurements to be displayed for operators at monitoring stations for example as an overlay of the power system grid.

In one aspect of the invention, a method is provided for monitoring of a power system having a plurality of locations forming a transmission and distribution grid, wherein each location includes a plurality of connected components. A plurality of pseudorandom signals are injected at selected locations in the power system. A plurality of power system data are collected at other selected locations in the power system in response to the injected signals. A dynamic behavior of the power system is determined through a synchronized cross-correlation of the injected signals with the collected power system data. The dynamic behavior of the power system is analyzed to assess a dynamic stability and security state of the power system. The real-time, dynamic stability and security state of the power system is displayed to an operator at a monitoring station. The operational stability and security state can be depicted on an overlay of the power system grid.

In another aspect of the invention, a system is provided for real-time monitoring of a power system having a plurality of locations forming a transmission and distribution grid, wherein each location includes a plurality of connected components. A plurality of components inject a plurality of pseudorandom signals at selected locations in the power system. A plurality of components collect a plurality of power system data at other selected locations in the power system in response to the injected signals. A component determines a dynamic behavior of the power system through a synchronized cross-correlation of the injected signals with the collected power system data. A component analyzes the dynamic behavior of the power system to assess a dynamic stability and security state of the power system. A monitoring station displays the real-time, dynamic stability and security state of the power system to an operator.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

Figure 1:
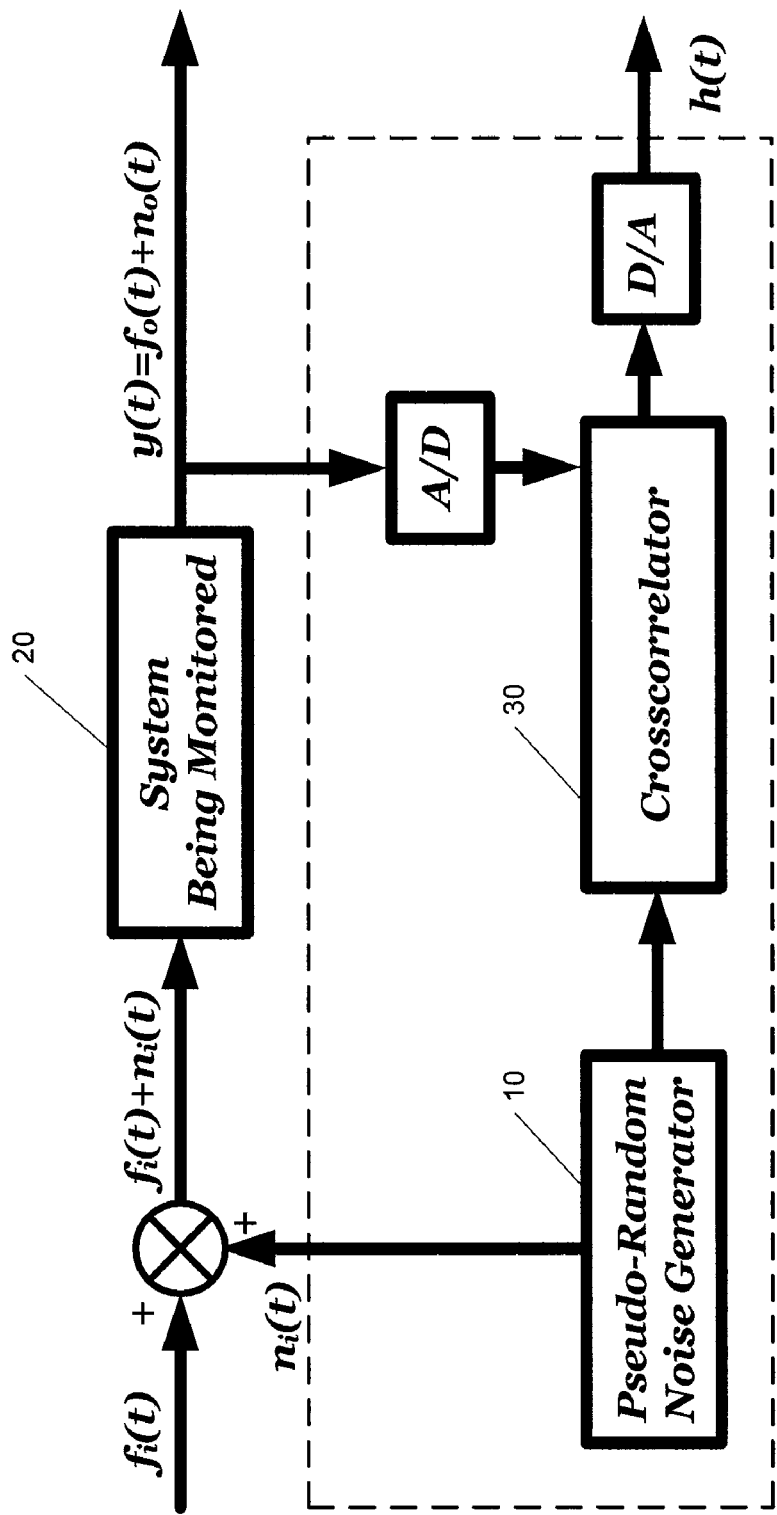
FIG. 1 illustrates an exemplary configuration for verifying the unique simplified cross-correlation algorithm used in embodiments of the invention.

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Embodiments of the invention leverage an architecture using a stimulus-response approach to calculating real-time actual system parameters without depending on the use of electric power system models. The embodiments of the invention provide additional security in the operation of the North American electric energy networks by enabling an additional separate means of monitoring with near real-time notification of power system disruptions. Alerting power system operators early allows quicker response to system disturbances, contributing to the mediation or prevention of cascading blackouts.

In one embodiment, a method of gathering real-time power system dynamic information is based on injecting specific pseudorandom noise signals at various points on the power system and cross-correlating power system data collected at other points with these injected signals. The result of each cross-correlation calculation is a parameter known as the impulse response between the injection point and the point on the power system where the data is sampled. This impulse response data completely describes in real-time the dynamic behavior of the power system between these two points. By applying the pseudorandom noise signals at specific points throughout the power system and calculating the impulse responses to other selected parameter sampling points, a complete dynamic real-time monitoring state can be obtained for operators and coordinators. Indicators for the monitoring system could be overlaid on a graphical representation or schematic of the power system grid. This approach is completely separate from the existing approach of using various monitoring systems provided by EMS vendors. It can therefore operate in parallel, yet completely independent and separate, as a single relatively inexpensive alternative for increasing the reliability of monitoring the nation's electric power system.

System Impulse Responses

A fundamental concept of the independent dynamic transmission monitoring system described herein is that of the system impulse response function, generally designated h(t). The impulse response of a system is the output of the system when it is presented with a very brief yet large input, i.e., an impulse. A given well-behaved system is completely described by its impulse response function and useful information can be derived directly from the time domain h(t) function. The impulse response function can be used to determine the output of a system to any given input function through the use of the convolution integral. Such systems must conform to certain characteristics such as linearity and ergodicity. By applying a Laplace transform, Z-transform, or Fourier transform to the time-domain impulse response function h(t), the system frequency response can be determined. The Fourier transform, H(ω) thus becomes the frequency domain description of the system and can be used to determine the dynamic characteristics of the system.

Cross-Correlation

In signal processing the cross-correlation between two signals can be described as the measure of the similarity of the two signals. Calculating the cross-correlation of two time domain signals typically involves shifting, multiplying, and averaging operations. By definition, the cross-correlation of two functions $f_i(t)$ and $f_o(t)$ is given by:

$$\psi_{io}(\tau) = \lim_{T \to \infty} \frac{1}{2T} \int_{-T}^{T} f_i(t-\tau) f_o(t) dt$$

A single cross-correlation value is thus calculated for each value of the time shift between the two signals. Autocorrelation is defined as the cross-correlation of a time domain signal with itself.

Impulse Response Determination from Cross-Correlation

For a "well behaved" system, its impulse response can be determined using cross-correlation techniques and random noise signals. With reference to FIG. 1, it can be shown that for practical "well-behaved" systems, the impulse response h(t) can be determined by cross-correlating a random noise input signal $n_i(t)$ with the resulting system output y(t) in cross-correlator 30. This can be accomplished even if there are other inputs $f_i(t)$ to the system being monitored 20 while the calculation is taking place. The requirements are that the random noise signal generated by pseudorandom noise generator 10 be uncorrelated with the other inputs and that the autocorrelation of the random noise signal be an impulse.

Binary noise signals can be generated easily using linear feedback shift registers. Binary sequences can be generated where a function of selected stages of the shift register, called taps, are used to feed the input. The discrete interval of these binary sequences is determined by the frequency of the shift register clocking.

If modulo 2 adders (e.g., exclusive OR function (XOR)) are used as the feedback function $f(x_1, x_2, x_3, \ldots x_n)$ of specific taps of an n-stage shift register to create the shift register input, binary sequences can be generated up to a length $2^n-1$ before repeating. Those that are of length $2^n-1$ are known as maximum length linear feedback shift register sequences, or pseudorandom sequences. They are used in many applications requiring randomness properties, for example, noise generators, cryptography, and spread spectrum telecommunications. Although they have some statistical properties of purely random sequences, they are deterministic and repeat every $2^n-1$ clock cycles. Pseudorandom discrete interval binary noise signals generated from maximum length shift register sequences can be successfully used to determine system impulse responses with the cross-correlation method.

Additionally, a unique, simplified cross-correlation algorithm for performing impulse response calculations using pseudorandom input signals has been described in U.S. Pat. No. 3,718,813, entitled "Technique for Correlation Method of Determining System Impulse Response," incorporated by reference herein. This algorithm calculates a system impulse response waveform during each repeated sequence of the pseudorandom noise signal. Use of this simplified algorithm can potentially reduce the complexity and cost of a field-implemented cross-correlator to that of an inexpensive microcontroller.

Applying the Cross-Correlation Method to the Power System

The cross-correlation method of real-time process identification has been successfully applied in the past to electrical systems, but not to a power transmission system. Embodiments of the invention apply the cross-correlation method of impulse response determination to the transmission system by injecting a low level pseudorandom signal at one point and performing a cross-correlation with a measured system parameter at another point.

The embodiments described herein leverage the deterministic nature of pseudorandom binary noise signals. Discrete interval binary signal injectors synchronized with a time standard are applied at selected points in the power grid. Sampling an electrical parameter, such as the current, at any other point in the nationwide electric power grid and performing a synchronized simplified cross-correlation calculation will yield the near real-time impulse response function. The impulse response function is for a system comprising the entire power system, with the input at the point of the injected pseudorandom signal, and the output at the point of the sampled parameter.

The cross-correlation method uses a "stimulus-response" approach to monitoring the power system rather than gathering power system parameters and applying them to an electric power system model. By using a low level injected pseudorandom signal and cross-correlating it with power system data taken in real-time at another point in the system, impulse response information can be obtained between the two locations in the power grid. The pseudorandom noise sequence and the cross-correlator must be time-synchronized. Time synchronization can be accomplished through number of standard approaches including GPS, IRIG, or NTP servers. The Global Positioning System (GPS) is a system of satellites and receiving devices used to compute positions on the earth. The GPS system is capable of delivering timing accuracies of within ten nanoseconds of coordinated universal time (UTC), with U.S. Department of Defense Selective Availability (SA) turned off. Exemplary GPS substation clocks that can be used with the monitoring system are provided by Arbiter Systems, Inc. IRIG is an acronym for Inter-Range Instrumentation Group codes for transmitting time of day signals. Network Time Protocol (NTP) is used to synchronize the time of a computer client or server to another server or reference time source, such as a radio or satellite receiver or modem. The NTP protocol format is provided by the National Institute of Standards and Technology (NIST) Internet Time Service. For power system-related impulse response calculations, the pseudorandom noise signal transducers can be independent of the output location data sampling and cross-correlation calculations as long as synchronization is maintained.

Figure 2:
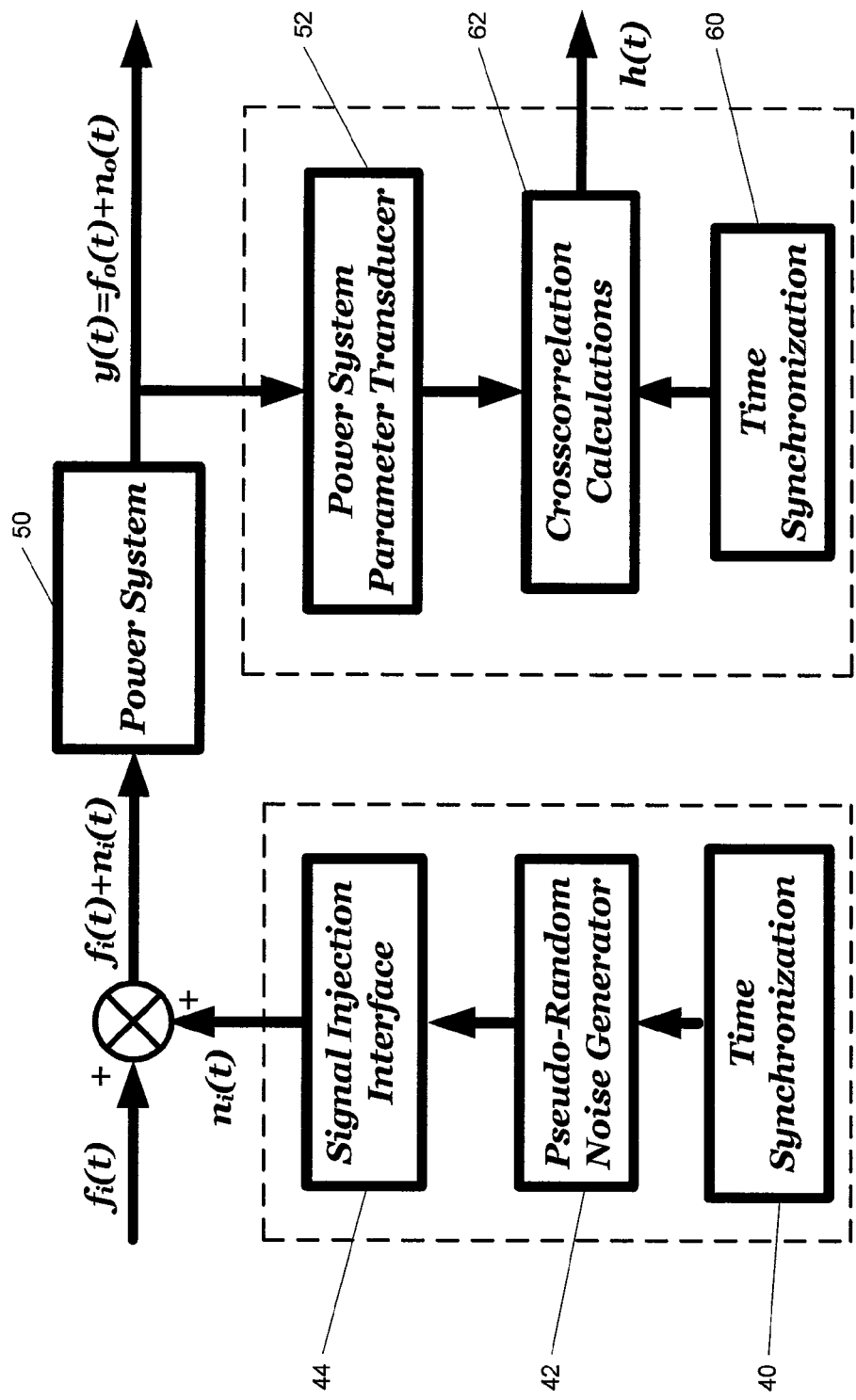
FIG. 2 illustrates the time synchronization of a pseudorandom noise signal with the cross-correlation calculation in generating the impulse response at a separate location from that where the noise signal is being applied.

FIG. 2 illustrates the time synchronization (blocks 40, 60) of a pseudorandom noise signal generated by pseudorandom noise generator 42 and signal injector 44 with the cross-correlation calculation 62 in generating the impulse response h(t) at a separate location in power system 50 from that where the noise signal is being applied. This provides dynamic power system information without relying on an accurate mathematical model of the grid. The actual real world system response information between the two locations on the grid is obtained dynamically in real-time using this approach.

Figure 3:
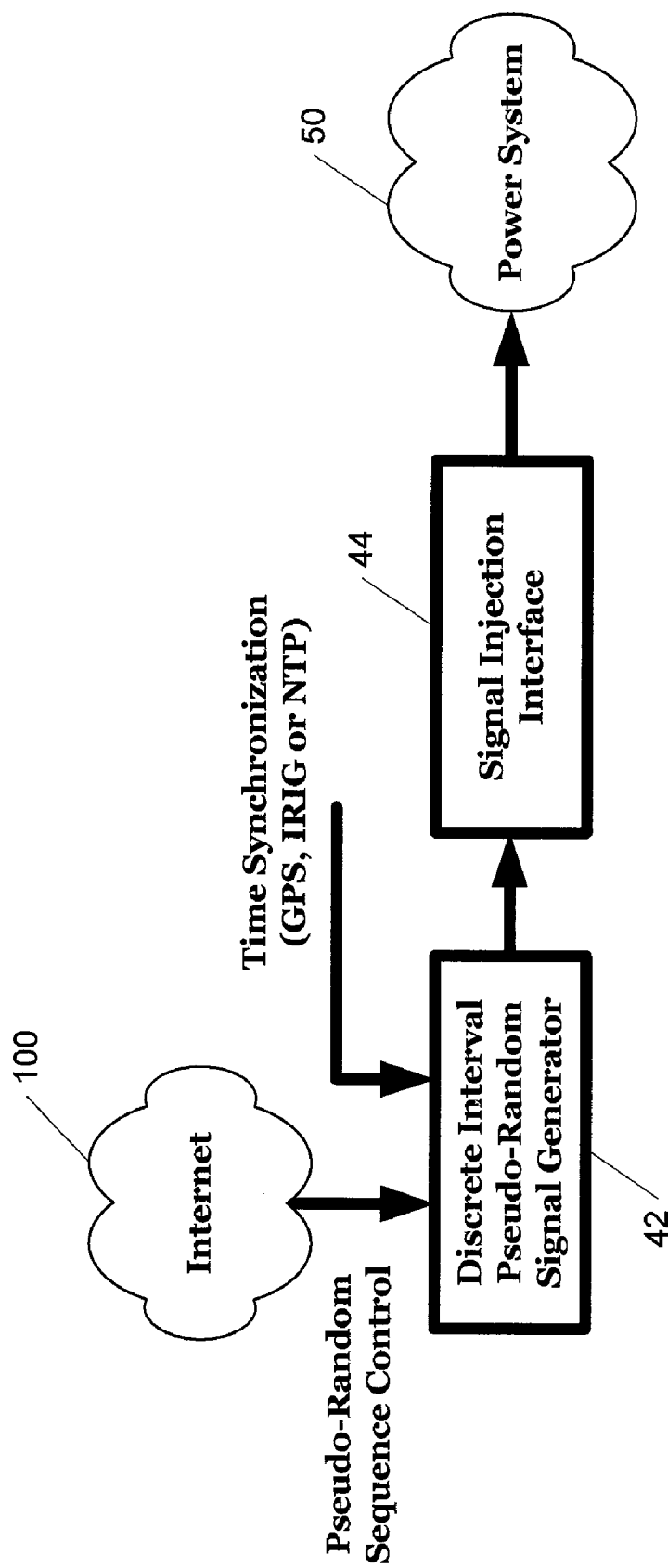
FIG. 3 illustrates injection of a time-synchronized pseudorandom signal into the power system at a point of interest in accordance with an exemplary embodiment of the invention.
Figure 4:
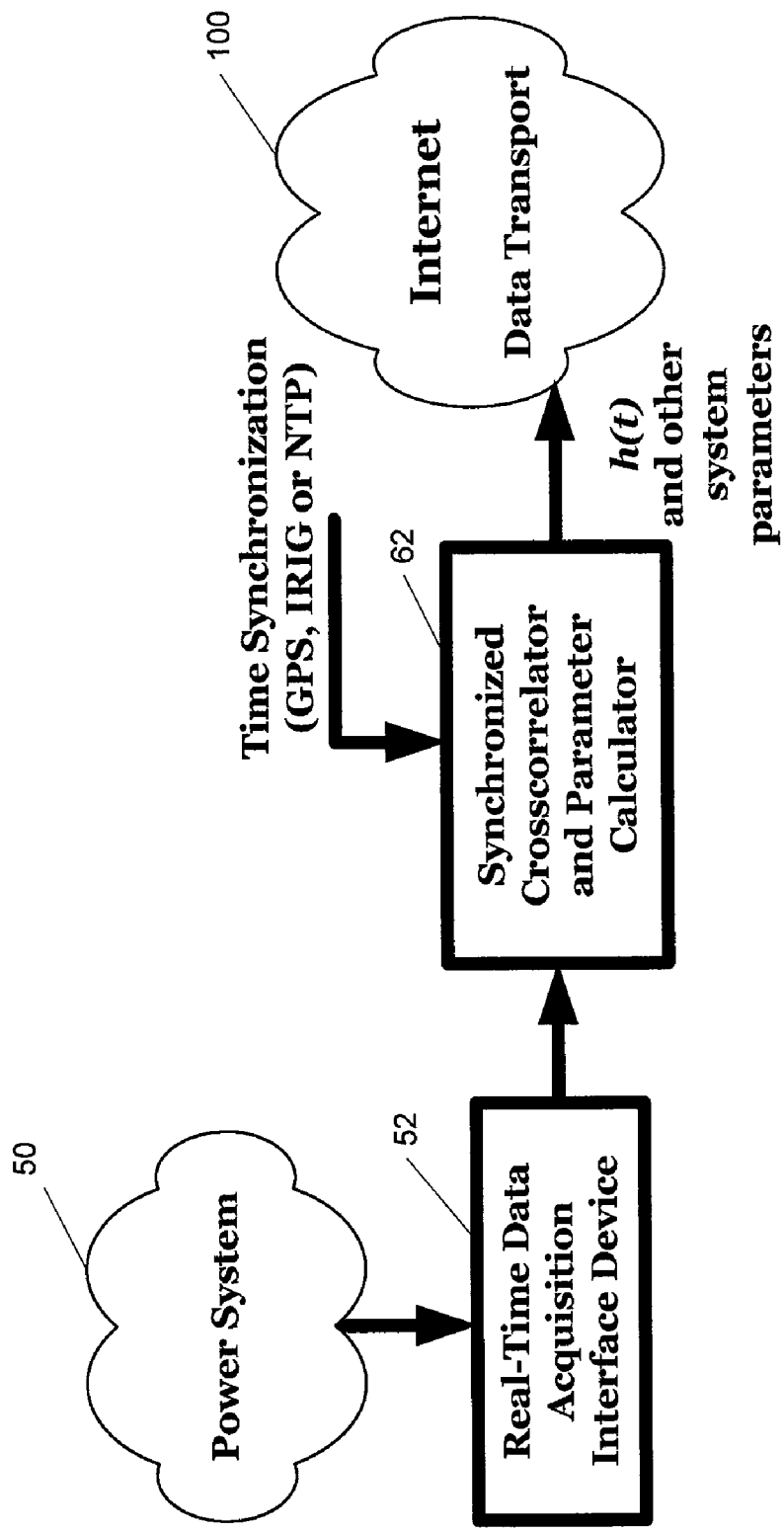
FIG. 4 illustrates a synchronized impulse response and parameter calculator sampling power system measurements at a point of interest and transmitting the encrypted calculated data to a monitoring center in accordance with an exemplary embodiment of the invention.

FIG. 3 illustrates injection of a time-synchronized pseudorandom noise signal into the power system at a point of interest. Pseudorandom sequence control signals can be provided via the Internet 100 to time-synchronized discrete interval pseudorandom signal generator 42. The pseudorandom noise signal is transmitted to a location in power system 50 via signal injector 44. FIG. 4 illustrates a synchronized impulse response and parameter calculator 62 sampling power system 50 measurements at a point of interest via real-time data acquisition interface device 52, and transmitting the encrypted calculated data to a monitoring center via the Internet 100.

As an example, a relatively low-level pseudorandom noise signal can be applied to a distribution feeder bus in Miami, Fla. A cross-correlation of this injected signal with the current in a transmission line in Canada results in an approximation of the impulse response function of the entire power system between the two points. Impulse response functions can be determined in one period of the pseudorandom sequence based signal. Dynamically monitoring selected impulse response functions and other derived information between various points on the electric power grid can contribute valuable system stability and security information for use by system operators. This can be accomplished without the use of conventional network-topology-based electric power system modeling. In other words, a system impulse response function picture is produced continuously despite changes in the network topology and evolving characteristics of power system components.

Figure 5A:
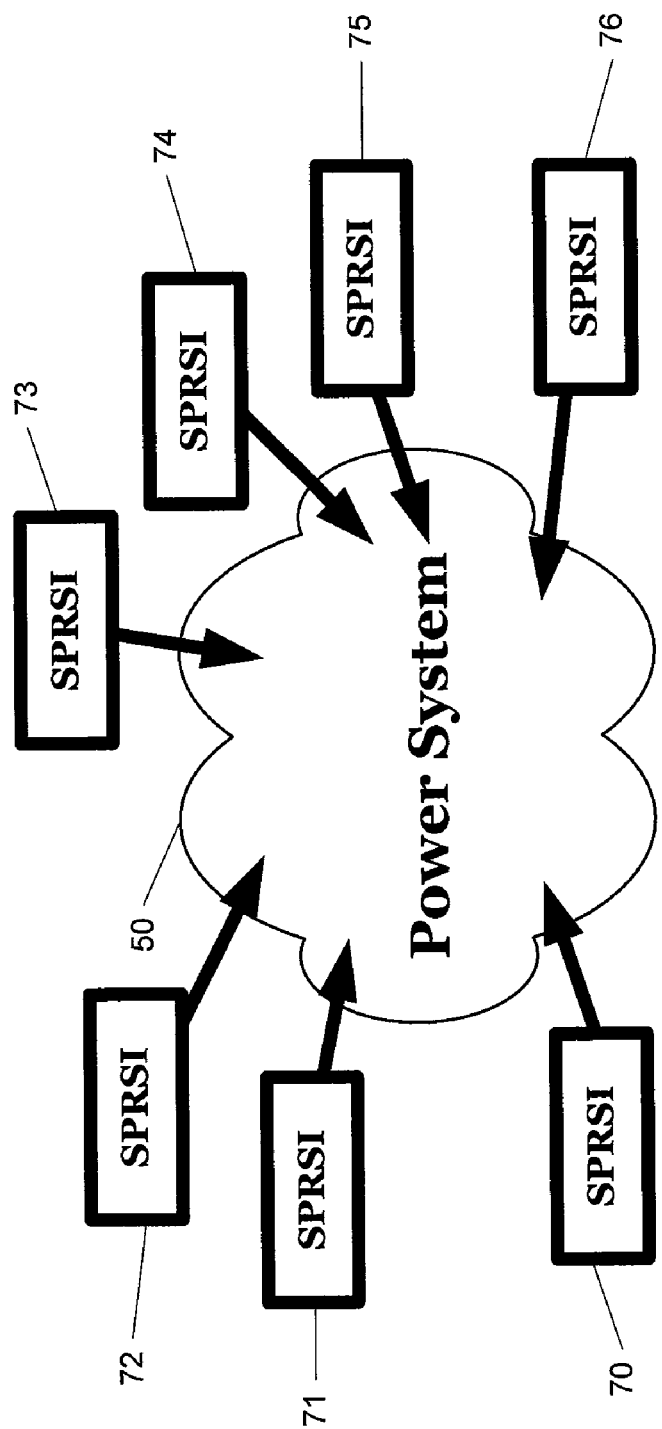
FIG. 5A illustrates the deployment of synchronized pseudorandom noise signal injectors throughout the power system in accordance with an exemplary embodiment of the invention.
Figure 5B:
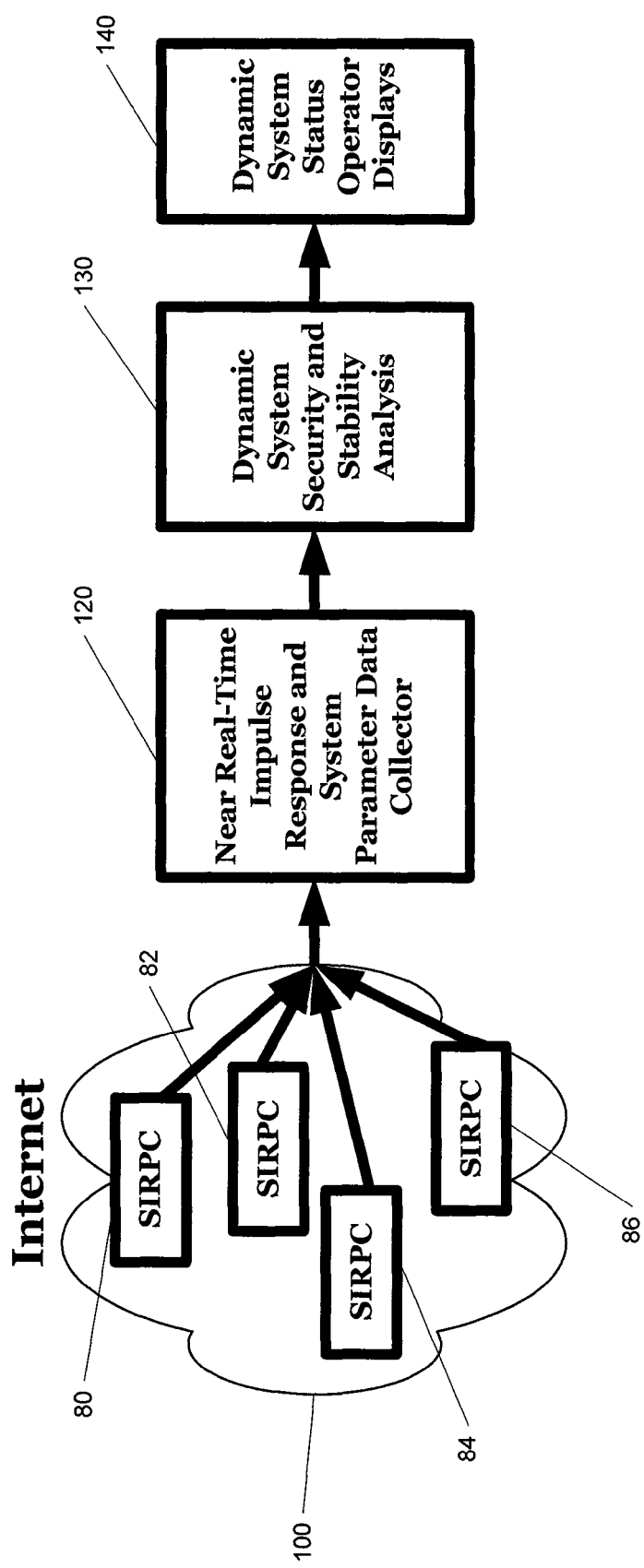
FIG. 5B illustrates the system-wide calculated impulse response and related data collected at a monitoring center for near real-time stability monitoring and analysis in accordance with an exemplary embodiment of the invention.

FIG. 5A illustrates the deployment of synchronized pseudorandom signal injectors (SPRSIs) 70, 71, 72, 73, 74, 75, 76 throughout the power system 50. Internet-connected microcontroller devices with secure communications to a monitoring host can generate and inject low level synchronized pseudorandom noise signals continuously into the transmission system from selected locations on the grid. As shown in FIG. 5B, similar microcontroller devices can gather synchronized data from other points on the transmission system and continuously calculate impulse response functions between the various locations on the transmission grid. More specifically, system impulse response and parameter calculators (SIRPCs) 80, 82, 84, 86 can be deployed throughout the power system at selected locations. The SIRPCs calculate the dynamic near-real time impulse response at their locations to inputs from SPRSIs deployed elsewhere in the power grid.

Placing SPRSIs at generating plant buses as well as tie points between utilities can provide information about the overall state of grid security and stability. Analyzing near-real-time voltage response information at locations around the power grid, calculated from the pseudorandom noise signal injected at a particular generating unit's bus, can indicate the relative health of the transmission system delivering that generating unit's energy. Similarly, analyzing current responses around the system from the binary pseudorandom noise signal injected at a particular transmission tie point between utilities can provide insight into the relative importance to the overall transmission grid connectivity of the given tie point. Monitoring the transmission buses at autobank locations, where different transmission voltage levels tie together, can also provide system operators with relative system stability indicators. Finally, monitoring the relative impact of large customer loads in near-real-time provides system operators enhanced insight into the stability of the surrounding transmission grid.

Figure 6:
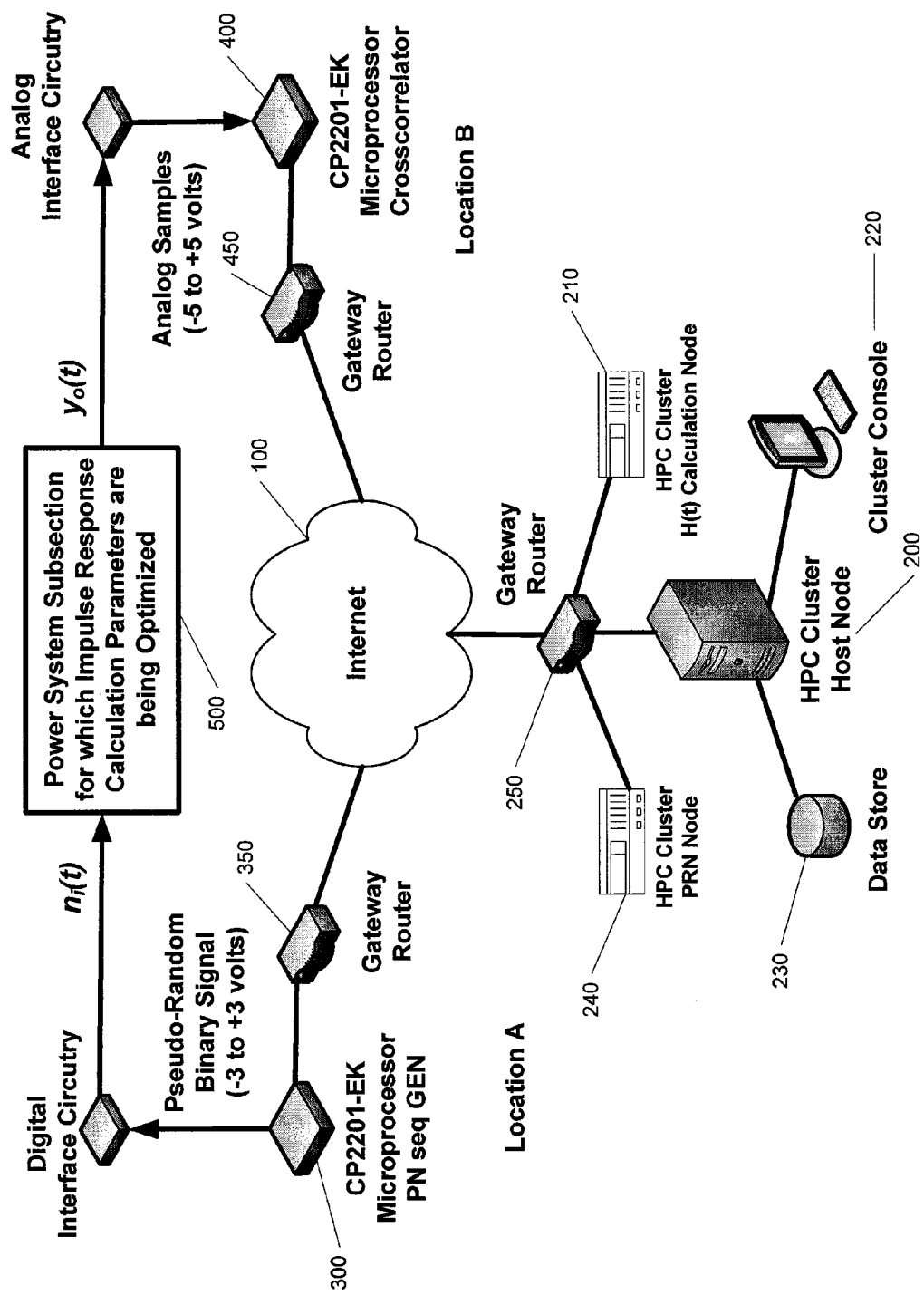
FIG. 6 illustrates a configuration for optimizing the parameters of an injected pseudorandom noise signal for a subsection of a power system.

FIG. 6 illustrates a configuration that can be used for optimizing the parameters of $n_i(t)$, the injected pseudorandom signal, for a specific subsection of the power system 500 from location A to another point on the power system at location B. At location B, analog samples, $y_o(t)$, of selected power system parameters (current, voltage, etc.) are sampled in synchronization with the injected pseudorandom signal at location A. Real-time impulse response data is calculated at location B using cross-correlation techniques and then transferred to the HPC cluster h(t) calculation node 210 through the Internet 100. Additional processing is performed in this node on the transferred impulse response data to produce numerical and graphic representations of the dynamic behavior of the power system 500 between locations A and B.

The parameters of the injected $n_i(t)$ noise signal to be optimized are: (1) injected signal magnitude, (2) P-N sequence bit rate, and (3) P-N sequence length. Settings and adjustments to these parameters are made from the High Performance Computer (HPC) cluster host node 200 through the cluster console 220 where an application is initiated on the HPC cluster PRN node 240 to perform the parameter adjustments for optimization. This application communicates through the Internet 100 to a specific SPRSI (synchronized pseudorandom signal injector) through an embedded web server in the SPRSI microcontroller. In the configuration depicted in FIG. 6, an implementation of the SPRSI function can be carried out by an 8051 class microprocessor-based microcontroller platform 300, such as the CP2201EK Embedded Ethernet Evaluation Kit available from Silicon Labs. Communication through the Internet from the SPRSI 300 to the HPC cluster PRN node 240 is via HyperText Transfer Protocol (HTTP). From the cluster console 220, the synchronized injected pseudorandom sequence can be initiated and the magnitude, bit rate, and sequence length set and adjusted to provide an optimum impulse response calculation at location B.

For this embodiment, the impulse response calculations are performed at location B by a microcontroller-based synchronized impulse response and parameter calculator (SIRPC) 400. The HPC cluster h(t) calculation node 210 communicates through the Internet 100 to a specific SIRPC through an embedded web server in the SIRPC microcontroller 400 using HTTP.

The continuous synchronized cross-correlation calculation data and parameters are transferred through the Internet 100 to the HPC cluster h(t) calculation node 210. Applications on this node, initiated from the cluster console 220 on the host node 200, create real-time numeric and graphic representations of the impulse response data. These representations provide a real-time characterization the dynamic behavior of the power system 500 between locations A and B. Adjustment of the injected $n_i(t)$ parameters are made to optimize the calculated cross-correlation data for the specific subsection of the power system between locations A and B.

As shown in FIG. 6, gateway routers 250, 350, 450 are used to connect the HPC cluster nodes 200 and the microcontrollers 300, 400 to the Internet 100. HPC clusters are easy to scale by simply adding more central processing units (CPUs) to increase the number of compute nodes. In exemplary embodiments, the compute nodes are typically based on the popular, widely available "Intel Compatible" CPUs. The compute nodes may contain local hard disk storage or simply use local random access memory (RAM) and boot from a host node 200 through a process called PXE Boot, (Preboot eXecution Environment). The PXE Boot process relies on a Trivial File Transfer Protocol (TFTP) server that loads the individual compute nodes with applications and data over the network at boot time. A host node 200 typically performs the TFTP server function in a diskless HPC cluster. In this configuration, hard disk storage on one or more host nodes provides data and application storage.

Figure 7:
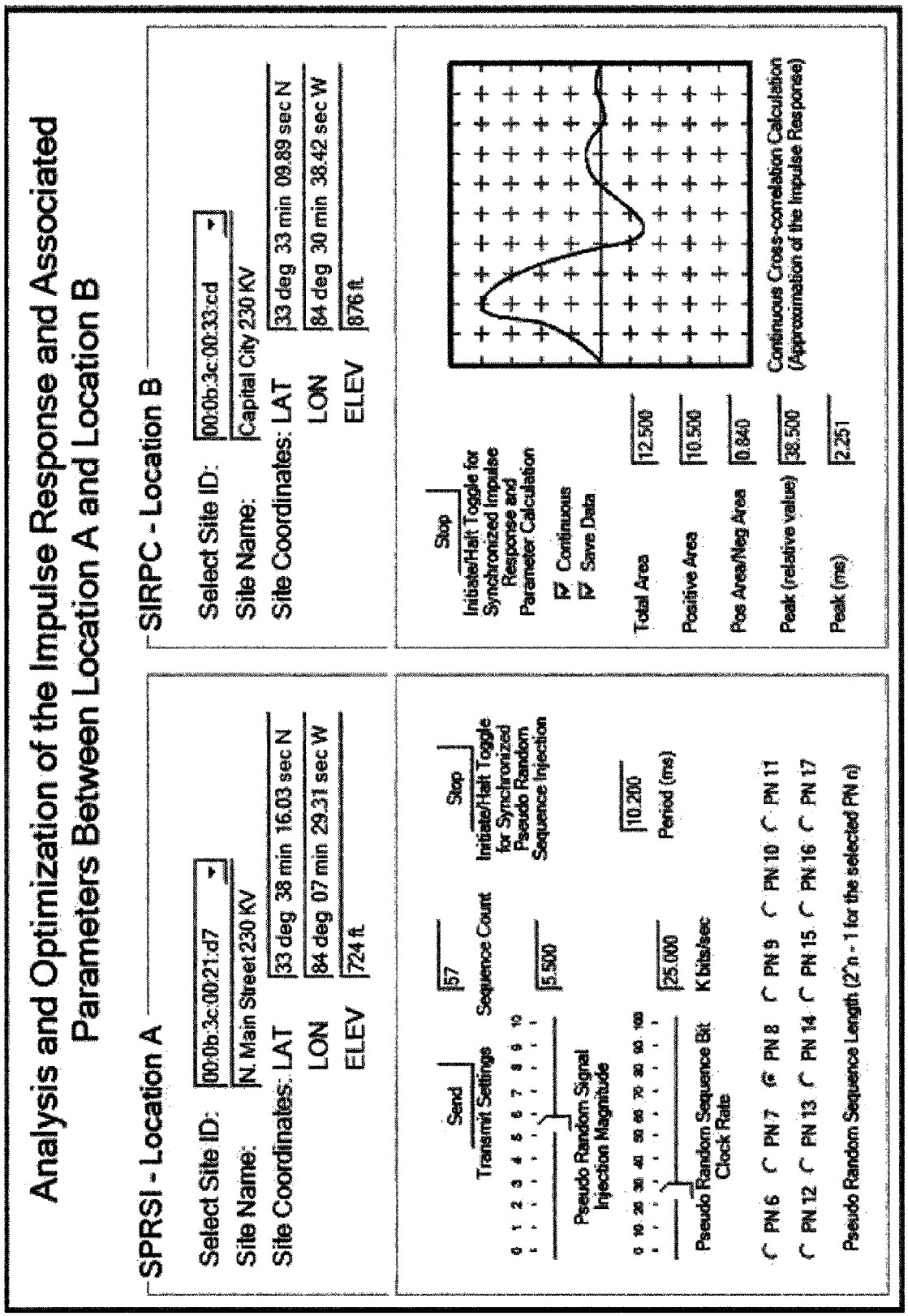
FIG. 7 illustrates an exemplary control panel display for the cluster console in embodiments of the invention.

FIG. 7 illustrates an exemplary control panel display for the cluster console depicted in the configuration of FIG. 6. The control panel is used to adjust the injected $n_i(t)$ parameters of the microcontroller-based SPRSI at location A so as to enable an optimum cross-correlation calculation by the microcontroller based SIRPC at location B on the power system.

The left side of the control panel display contains the controls for identifying the SPRSI at Location A and setting the parameters of injected signal magnitude, P-N sequence bit rate, and P-N sequence length. The microcontroller SPRSI is identified by its IEEE 802.2 Media Access Control (MAC) address. Once the SPRSI is selected from a drop-down menu, the site name and location coordinates appear in their respective fields, along with the site elevation, on the upper left side of the screen. Using the two sliders, the relative signal injection magnitude and the P-N sequence bit clock rate can be selected. Text boxes to the right of the sliders indicate the numeric value selected. Radio buttons positioned below the sliders are used to select the P-N sequence length. For example, selecting the radio button "PN 8" will cause the SPRSI to inject a P-N sequence of length $2^8-1=255$ bits. Based on the sequence bit rate and length, a P-N sequence period is calculated and displayed in a text box on the left side of the screen. Once the three P-N sequence parameters are selected, clicking the "Transmit Settings" button sends the selected parameters to the microcontroller SPRSI at location A. Finally, clicking the "Initiate/Halt Toggle" button starts the selected sequence injection. Clicking the button again will stop the microcomputer SPRSI from injecting the selected sequence.

The right side of the control panel screen depicted in FIG. 7 can be used to select and control the microprocessor SIRPC at location B. Once the IEEE 802.2 MAC address of the microcontroller SIRPC for location B is selected from the drop-down menu, the site name and location coordinates appear in their respective fields, along with the site elevation, on the upper right side of the screen. By checking the "Continuous" check box, impulse and parameter calculations are performed continuously when the "Initiate/Halt Toggle" is clicked. If the "Save Data" check box is checked, the cross-correlation impulse response calculation data and parameters will be saved on the data store 230 of the HPC Cluster Host Node 200 shown in FIG. 6. A continuously updating graphic of the cross-correlation impulse response waveform is displayed in a window on the lower right side of the screen. Numeric values of several calculated parameters are displayed in text fields on the right side of the display. The calculated parameters include the total area under the response curve, the total positive area, the ratio of the positive area to the negative area, the relative value of the first peak of the waveform, and the time the first peak occurs relative to the beginning of a P-N sequence, in milliseconds.

By using the controls on the left side of the control panel screen to adjust the injected P-N sequence parameters at location A, and observing the cross-correlation impulse response waveform and numeric parameters calculated at location B, an optimum set of dynamic indicators may be continuously obtained for monitoring power system behavior between the two locations. This optimization process may be used between the various locations throughout the power system where the SPRSIs and SIRPCs are deployed.

This real-time cross-correlation calculation technique can be used between selected locations throughout the electric grid to calculate multiple simultaneous impulse response data sets and therefore provide an overall dynamic real-time image of the instantaneous status of the entire power system. An overall status of the "state of connectedness" of the power grid can be monitored in real-time and, by using visualization techniques, this can be used to provide operators with graphic indicators of where and how intense "operating weaknesses" are in the system.

Figure 8:
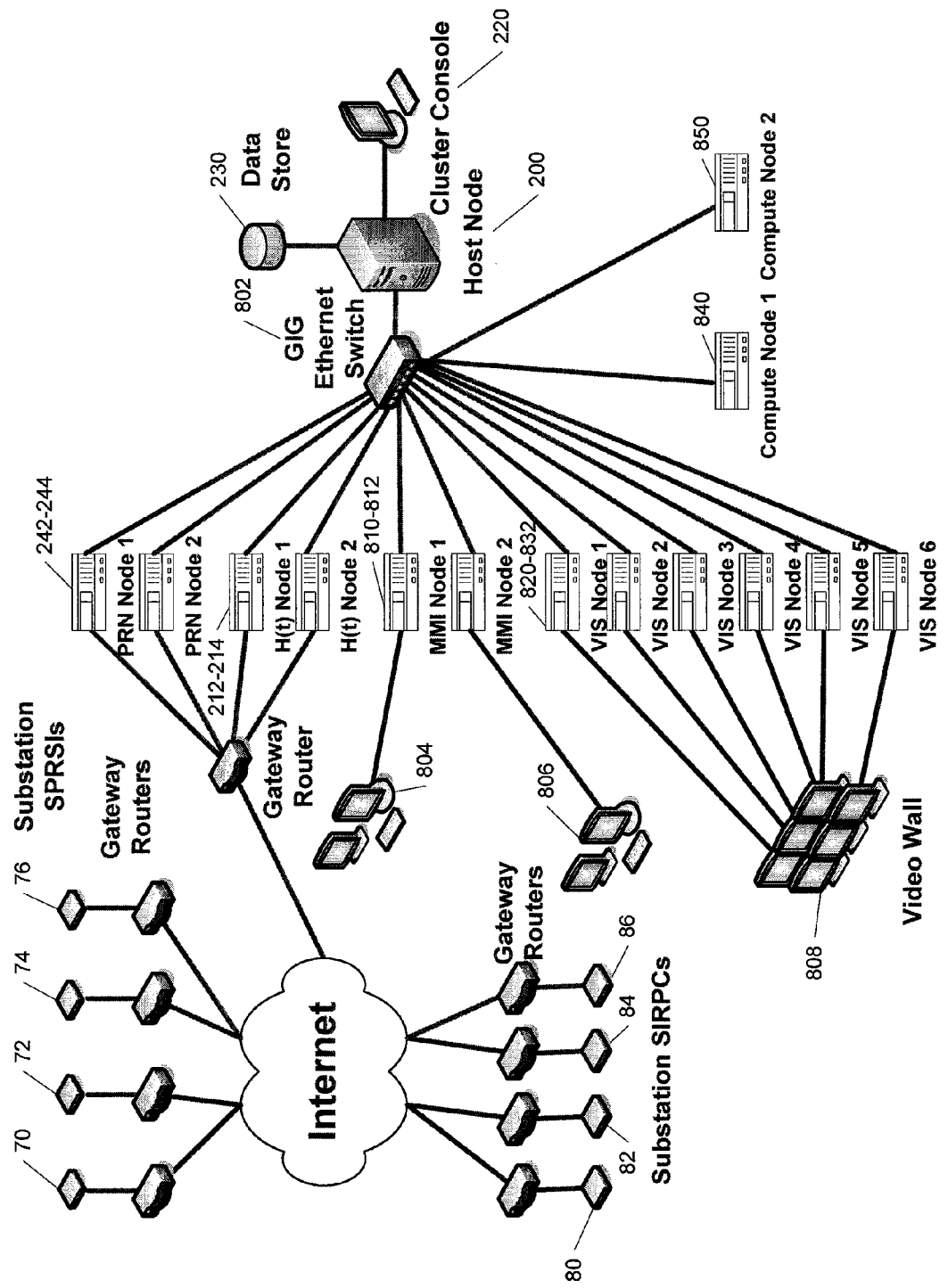
FIG. 8 illustrates an dynamic transmission monitoring system using the cross-correlation method in accordance with an exemplary embodiment of the invention.

A central host system based on a high performance computing (HPC) cluster architecture will collect and process the array of continuous impulse response calculations and create numeric and visual representations of the dynamic state of the transmission system. FIG. 8 illustrates an exemplary dynamic transmission monitoring system using the cross-correlation method. The synchronized pseudorandom signal injectors (SPRSIs) 70-76 and the synchronized impulse response and parameter calculators (SIRPCs) 80-86 are located in substations and inter-utility tie points throughout the power system. They communicate with the monitoring center 800 through the Internet 100 using HTTP. They are configured with a "phone home" capability to contact a specific predetermined compute node 840, 842 in the monitoring center 800 if they are not contacted for a specific period of time, or if they are new to the overall architecture, e.g., initial installation. This "phone home" registration allows the monitoring center to reestablish communications with SPRSIs 70-76 and SIRPCs 80-86 if connectivity through the Internet 100 is lost for a period of time.

The architecture of the high performance computing cluster monitoring center 800 depicted in FIG. 8 for an exemplary embodiment includes various compute nodes that support the parallel computational and input/output (I/O) functions described in the following paragraphs.

PRN nodes 242, 244 support the functions of starting, stopping and adjusting the parameters of the synchronized pseudorandom signal injectors (SPRSIs) 70-76 located throughout the power system.

H(t) Nodes 212, 214 support the functions of starting, stopping and acquiring the cross-correlation data from the synchronized impulse response and parameter calculators (SIRPCs) 80-86 located throughout the power system.

MMI Nodes 810, 812 respond to requests from system operators, engineers, planners and coordinators at MMI consoles 804, 806 for real-time dynamic power system configuration information by generating numeric and graphical displays of power system state.

VIS Nodes 820-832 generate a high resolution multi-screen video wall 808 depicting three dimensional (3D) visualizations of the real-time dynamic power system state based on the collected impulse response data from locations throughout the power system. The video wall 808 can be controlled by requests from the various MMI consoles 804, 806.

Compute Nodes 840, 850 perform calculations and analysis on the collected impulse response data from H(t) nodes 212, 214 to produce numeric and graphical information for use by MMI nodes 810, 812 and VIS nodes 820-832.

Host Node 200 performs cluster management, initializing, starting, stopping and altering cluster processes on the various compute nodes through the cluster console 220. The host node 200 also incorporates at least one data store hard disk 230 for cluster initialization and archival information storage.

The low latency network fabric of the depicted HPC Cluster is based on Gigabit Ethernet. Each compute node connects to a Gigabit Ethernet switch 802 and inter-node communications is accomplished using Message Passing Interface (MPI) libraries. MPI is the industry-standard Message Passing Interface.

The architecture depicted in FIG. 8 is identical to the architecture used by the vast majority of the fastest, most powerful supercomputers currently available. The depicted configuration uses the Linux operating system (OS), cluster technology, Gigabit Ethernet switches, and commodity off-the-shelf CPUs.

The depicted HPC cluster uses diskless compute nodes that boot using PXE, (Preboot eXecution Environment). In this environment, the compute nodes are booted from a TFTP server running on the Host Node 200. The PXE boot process loads the OS and initial applications into the compute node's RAM and starts initial execution of the node processes. The gateway routers 250 are used to interface the PRN nodes 242, 244 and the H(t) nodes 212, 214 to the Internet 100 where they communicate over HTTP to web servers in the SPRSIs 70-76 and SIRPCs 80-86 located throughout the power system.

The following paragraphs describe the various users at the MMI consoles 804, 806 of the monitoring system 800 depicted in FIG. 8. The users include system operators, system engineers, system planners, and system reliability coordinators.

System operators are users who normally operate the power system. They continually monitor the normal power system operating parameters and execute routine system operating procedures such as pre-arranged switching. When system anomalies occur, the system operators take pre-established remedial action to restore the power system to its normal operating state.

System engineers are users who have engineering knowledge of the power system and review changes to the power system configuration for stability and security. They develop the operating procedures that system operators follow.

System planners are users who use the historical power system data and customer needs to plan future additions and modifications to the power system.

System reliability coordinators are users who monitor the overall power system for indications of overall system instability.

Figure 9:
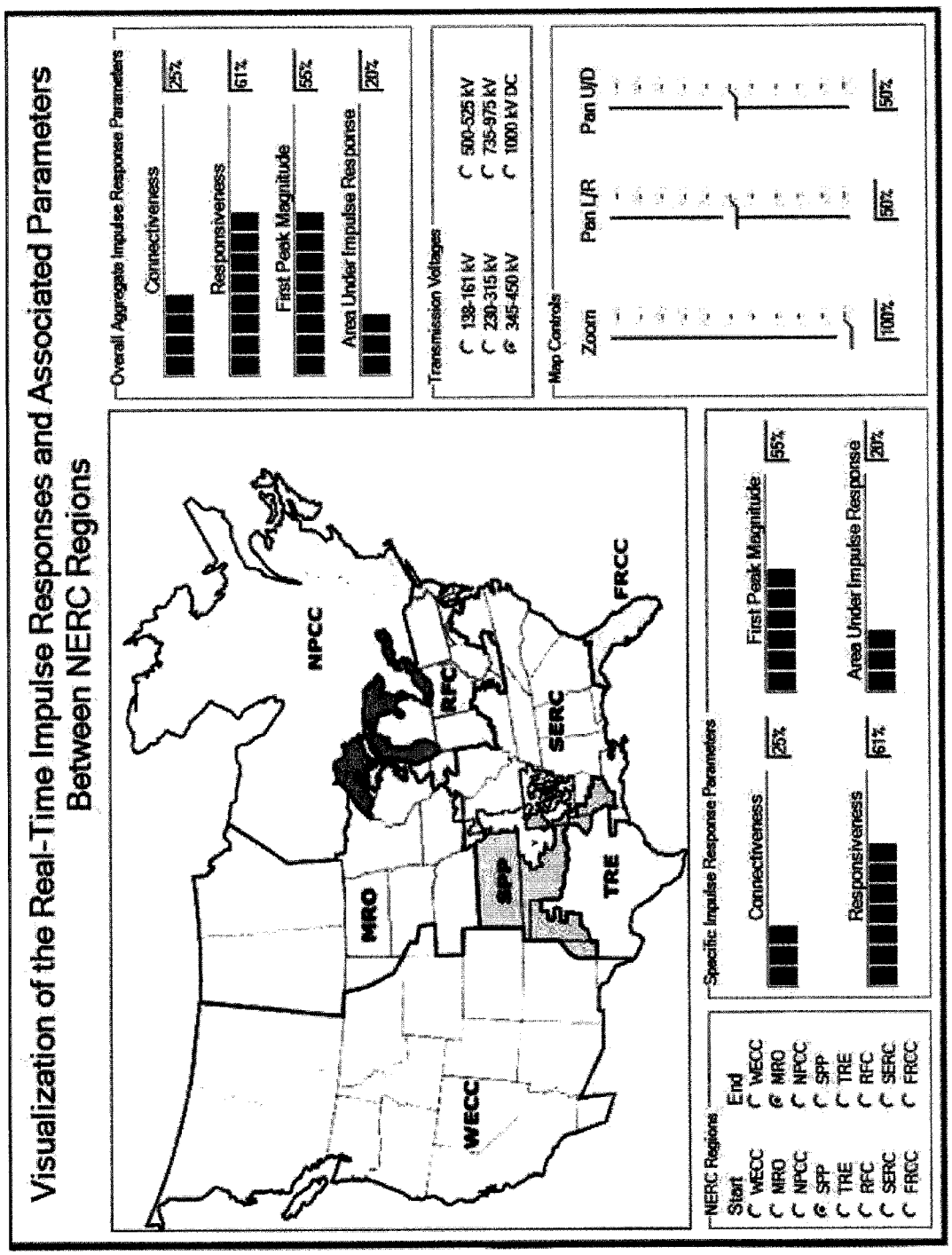
FIG. 9 illustrates a sample control center display screen for monitoring the real-time dynamic state of the transmission grid.

FIG. 9 illustrates a sample control center display screen for monitoring the real-time state of the transmission grid. The graphic window in the display provides the control center users (i.e., operators, engineers, planners and coordinators) with a visual depiction of the aggregate impulse response data for the various areas of the nationwide transmission grid. These visual depictions are geographically based and illustrate the spatial orientation of the actual source locations of the SIRPCs that are collecting the impulse data from substations, generating plants and tie lines throughout the grid.

In the "Overall Aggregate Impulse Response Parameters" section of the display, four real-time bar indicators are depicted, providing the operator with a dynamic overall aggregate roll-up of the: (1) consecutiveness, (2) responsiveness, (3) magnitude of the first peak of the impulse responses, and (4) area under the impulse response waveforms based on response data collected throughout the power system. This display illustrates an example of what can be displayed for operators; there are many other calculated impulse response parameters and characteristics that could be aggregated and rolled up to a single bar indicator. Using pattern recognition techniques with historical data, indicators can be generated that can be used as early warning indicators of impending power system abnormal conditions.

The "Transmission Voltages" selection section allows the operator to select specific transmission voltages on the power grid for monitoring and analysis. The voltage ranges depicted are often used in the power transmission industry; however, others ranges or even specific voltages can also be used for selected monitoring.

The "Map Controls" section includes slider controls that provide a mechanism for the operator to select a specific viewing window of the geographical base under the transmission system as well as any real-time dynamic indicators that may be displayed based on calculated impulse response data.

The "Specific Impulse Response Parameters" section of the display includes four real-time bar indicators that are similar to the indicators in the "Overall Aggregate Impulse Response Parameters" section. However, the values depicted are based on calculated roll-up impulse response parameters and characteristics based on the transmission grid interfaces between two specifically selected North American Reliability Corporation (NERC) regions.

The "NERC Regions" section of the display provides for the selection of start and end NERC regions as the basis for calculating roll-up impulse response parameters and characteristics. On this display, these roll-up values are displayed in the "Specific Impulse Response Parameters" section. The NERC Regions are simply examples of areas that can be chosen for the power system interaction analysis based on collected real-time data. Other areas and regions would also be selectable.

The different NERC Regions are as follows:
TRE—Texas Regional Entity
FRCC—Florida Reliability Coordinating Council
MRO—Midwest Reliability Organization
NPCC—Northeast Power Coordinating Council
RFC—Reliability First Corporation
SERC—Southeastern Electric Reliability Council
SPP—Southwest Power Pool
WECC—Western Electricity Coordinating Council As described above, the controls on the display provide a mechanism for selecting areas of the grid for specific monitoring. For example, the relative strength or weakness of the electrical tie between two of the control areas can be monitored visually. An operator can select two regions on the map and then select an aggregate impulse response parameter or characteristic to be calculated and displayed as the length of a single arrow on the map between the two regions. This might be an impulse response parameter such as the relative peak value of the calculated impulse waveform. Similarly, impulse response parameters can be selected and displayed as multiple arrows representing the various physical transmission ties between selected regions. An example is shown in the example graphic window between NERC regions SPP and MRO.

The "overall connectiveness" of the power system is represented as a single numeric indicator of the aggregate impulse data that corresponds to a measure of how tight or loose the ties between the various parts of the grid are at a given point in time. The "selected connectiveness" between specific selected areas of the power grid corresponds to a measure of how tight or loose the ties between the specific selected areas of the grid are at a given point in time. These measurements can be used with historic data to provide an early warning to operators of possible impending system anomalies.

The "overall responsiveness" of the power system is represented as a single numeric indicator of the aggregate impulse data that corresponds to a measure of how responsive the various parts of the grid are to others around them at a given point in time. The "selected responsiveness" between specific selected areas of the power grid, such as NERC regions, corresponds to a measure of how responsive the various parts of the grid are to another designated area of the grid at a given point in time. These measurements can be used with historic data to provide an early warning to operators of possible impending system anomalies.

The first peak magnitude and area under the impulse response numeric roll-up calculations depicted on the display are simply examples of the various impulse response parameters and characteristics that can be used as overall power system monitoring indicators for operators. There are many more parameters and characteristics that can be used as dynamic monitoring indicators.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the scope of the present invention.

In addition, it is possible to use some of the features of the present invention without the corresponding use of the other features. Accordingly, the foregoing description of the exemplary embodiments is provided for the purpose of illustrating the principles of the present invention, and not in limitation thereof, since the scope of the present invention is defined solely by the appended claims.

What is claimed:

1. A method for real-time monitoring of a power system having a plurality of locations forming a transmission and distribution grid, wherein each location includes a plurality of connected components, the method comprising:
   injecting a plurality of pseudorandom signals at selected locations in the power system;
   collecting a plurality of power system data at other locations in the power system in response to the injected signals;
   determining a dynamic behavior of the power system through a synchronized cross-correlation of the injected signals with the collected power system data;
   analyzing the dynamic behavior of the power system to assess a stability and security state of the power system; and
   displaying the stability and security state of the power system to an operator at a monitoring station.

2. The method for real-time monitoring of a power system of claim 1 wherein the pseudorandom signals comprise pseudorandom binary noise sequences.

3. The method for real-time monitoring of a power system of claim 2 wherein the pseudorandom binary noise sequences are injected using a discrete interval binary signal injector.

4. The method for real-time monitoring of a power system of claim 1 further comprising synchronizing the injection of pseudorandom signals with a reference time source.

5. The method for real-time monitoring of a power system of claim 1 wherein the step of injecting pseudorandom signals is performed continuously by a plurality of Internet-connected microcontroller devices deployed at the selected locations in the power system.

6. The method for real-time monitoring of a power system of claim 5 wherein the pseudorandom signals are injected at a generating unit bus.

7. The method for real-time monitoring of a power system of claim 5 wherein the pseudorandom signals are injected at a transmission tie point between neighboring electric utility systems.

8. The method for real-time monitoring of a power system of claim 1 wherein the synchronized cross-correlation of the injected signals with the collected power system data is performed continuously by a plurality of Internet-connected microcontroller devices deployed at the other locations in the power system.

9. The method for real-time monitoring of a power system of claim 1 further comprising transmitting encrypted real-time impulse response data and calculated system parameter data to the monitoring station.

10. The method for real-time monitoring of a power system of claim 1 further comprising hosting the monitoring station on a central computer having a high performance computing (HPC) cluster architecture.

11. The method for real-time monitoring of a power system of claim 1 wherein the step of injecting a plurality of pseudorandom signals further comprises setting a plurality of parameters for each injected signal and initiating the injection on a cluster console.

12. The method for real-time monitoring of a power system of claim 11 wherein the plurality of parameters for each injected signal includes an injected signal magnitude, a pseudorandom sequence bit rate, and a pseudorandom sequence length.

13. The method for real-time monitoring of a power system of claim 12 further comprising displaying a cross-correlation impulse response waveform representing a continuous calculation of the cross-correlation of an injected signal with collected power system data.

14. The method for real-time monitoring of a power system of claim 13 further comprising displaying a plurality of calculated parameters associated with the cross-correlation impulse response waveform, including at least one of a total area under the response waveform, a total positive area under the response waveform, a ratio of the total positive area to the total area, a relative value of a first peak of the waveform, and a time at which the first peak occurs relative to the beginning of a pseudorandom sequence.

15. The method for real-time monitoring of a power system of claim 1 wherein the stability and security state is assessed by determination of at least one of a connectiveness between at least two selected regions of the transmission and distribution grid, a responsiveness between at least two selected regions of the transmission and distribution grid, an aggregated first peak magnitude of the impulse response waveform, and an aggregated area under the impulse response waveform for a plurality of response data collected throughout the power system.

16. A system for real-time monitoring of a power system having a plurality of locations forming a transmission and distribution grid, wherein each location includes a plurality of connected components, comprising:
a plurality of components for injecting a plurality of pseudorandom signals at selected locations in the power system;
a plurality of components for collecting a plurality of power system data at other locations in the power system in response to the injected signals;
a component for determining a dynamic behavior of the power system through a synchronized cross-correlation of the injected signals with the collected power system data;
a component for analyzing the dynamic behavior of the power system to assess a dynamic stability and security state of the power system; and
a monitoring station for displaying the real-time, dynamic stability and security state of the power system to an operator.

17. The system for real-time monitoring of a power system of claim 16 wherein the pseudorandom signals comprise pseudorandom binary noise sequences.

18. The system for real-time monitoring of a power system of claim 17 further comprising a plurality of discrete interval binary signal injectors for injecting pseudorandom binary noise sequences.

19. The system for real-time monitoring of a power system of claim 16 wherein the injecting of pseudorandom signals is synchronized with a reference time source.

20. The system for real-time monitoring of a power system of claim 16 wherein each discrete interval binary signal injector comprises a microcontroller deployed at each of the selected locations.

21. The system for real-time monitoring of a power system of claim 16 further comprising a plurality of Internet-connected microcontroller devices deployed at the other locations in the power system for continuous synchronized cross-correlation of the injected signals with the collected power system data.

22. The system for real-time monitoring of a power system of claim 16 further comprising a component for encrypting and transmitting real-time impulse response data and calculated system parameter data to the monitoring station.

23. The system for real-time monitoring of a power system of claim 16 wherein the monitoring station comprises a central computer having a high performance computing (HPC) cluster architecture.

24. The system for real-time monitoring of a power system of claim 16 further comprising a user interface for setting a plurality of parameters for each injected signal and initiating the injection of the pseudorandom signals at a selected location.

25. The system for real-time monitoring of a power system of claim 24 wherein the plurality of parameters for each injected signal includes an injected signal magnitude, a pseudorandom sequence bit rate, and a pseudorandom sequence length.

26. The system for real-time monitoring of a power system of claim 16 further comprising a component for displaying a cross-correlation impulse response waveform representing a continuous calculation of the cross-correlation of an injected signal with collected power system data.

27. The system for real-time monitoring of a power system of claim 26 further comprising a component for displaying a plurality of calculated parameters associated with the cross-correlation impulse response waveform, including at least one of a total area under the response waveform, a total positive area under the response waveform, a ratio of the positive area to the total area, a relative value of a first peak of the waveform, and a time at which the first peak occurs relative to the beginning of a pseudorandom sequence.

28. The system for real-time monitoring of a power system of claim 16 wherein the component for analyzing assesses the dynamic stability and security state by determining at least one of a connectiveness between at least two selected regions of the transmission and distribution grid, a responsiveness between at least two selected regions of the transmission and distribution grid, an aggregated first peak magnitude of the impulse response waveform, and an aggregated area under the impulse response waveform for a plurality of response data collected throughout the power system.

* * * * *